(12) United States Patent
Sharma et al.

(10) Patent No.: US 10,602,000 B2
(45) Date of Patent: Mar. 24, 2020

(54) POLICY DECISIONS BASED ON OFFLINE CHARGING RULES WHEN SERVICE CHAINING IS IMPLEMENTED

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 592 days.

(21) Appl. No.: 14/527,681

(22) Filed: Oct. 29, 2014

(65) Prior Publication Data
US 2016/0127564 A1 May 5, 2016

(51) Int. Cl.
*H04M 15/00* (2006.01)
*H04L 12/24* (2006.01)

(52) U.S. Cl.
CPC ........ *H04M 15/66* (2013.01); *H04L 41/0893* (2013.01); *H04L 41/5058* (2013.01)

(58) Field of Classification Search
CPC ...... H04M 15/66; H04W 8/18; H04L 41/5058
See application file for complete search history.

(56) References Cited

U.S. PATENT DOCUMENTS

| | | | |
|---|---|---|---|
| 7,948,952 B2 | 5/2011 | Hurtta et al. | |
| 2004/0133678 A1* | 7/2004 | Tamura | G06F 16/258 709/225 |
| 2009/0307746 A1 | 12/2009 | Di et al. | |
| 2010/0046444 A1* | 2/2010 | Lin | H04L 47/14 370/329 |
| 2011/0022580 A1 | 1/2011 | Badulescu et al. | |
| 2011/0238547 A1* | 9/2011 | Belling | G06Q 30/04 705/34 |
| 2012/0233656 A1 | 9/2012 | Rieschick et al. | |
| 2012/0271958 A1* | 10/2012 | Oh | H04L 12/14 709/228 |
| 2012/0331516 A1 | 12/2012 | Perez et al. | |

(Continued)

OTHER PUBLICATIONS

Enabling Agile Service Chaining with Service Based Routing, Copyright Huawei Technologies Co., Ltd.2013.

(Continued)

*Primary Examiner* — Charles N Appiah
*Assistant Examiner* — Xiang Zhang
(74) *Attorney, Agent, or Firm* — Duft & Bornsen, PC

(57) ABSTRACT

Apparatus and methods for policy decisions regarding a service data flow enabled for service chaining. One embodiment comprises a policy control element configured to make policy decisions for a session. The policy control element communicates with an offline charging system. The policy control element detects a new service added to the service chain implemented for the service data flow, and transmits a charging rules request to the offline charging system responsive to detecting the new service being added to the service chain. The policy control element receives a response from the offline charging system that includes offline charging rules that are mapped to the new service of the service chain, makes a policy decision for the service data flow based on the offline charging rules, and transmits the policy decision to a policy enforcement element.

20 Claims, 6 Drawing Sheets

(56) References Cited

U.S. PATENT DOCUMENTS

| | | | |
|---|---|---|---|
| 2013/0188554 A1* | 7/2013 | Cai | H04M 15/65 |
| | | | 370/328 |
| 2013/0196623 A1* | 8/2013 | Lehane | H04M 15/65 |
| | | | 455/406 |
| 2013/0258849 A1* | 10/2013 | Sharma | H04L 12/1407 |
| | | | 370/235 |
| 2013/0262308 A1 | 10/2013 | Cai | |
| 2015/0092551 A1* | 4/2015 | Moisand | H04L 12/4633 |
| | | | 370/235 |

OTHER PUBLICATIONS

Enabling Service Chaining on Cisco Nexus 1000V Series, 2013 Cisco.
Haeffner, Service Function Chaining, BOF Session IETF88, Vancover, 44th Meeting of ITG 5.24 Expert Group, Nov. 15, 2013.
Software-defined networking: the service provider perspective, Ericsson Review, Feb. 21, 2013.
3rd Generation Partnership Project, Proximity-based Services, 3GPP TS 23.203, Version 13.1.0 (Sep. 2014).

\* cited by examiner

POLICY DECISIONS BASED ON OFFLINE CHARGING RULES WHEN SERVICE CHAINING IS IMPLEMENTED

FIELD OF THE INVENTION

The invention is related to the field of communication systems and, in particular, to policy control within communication systems.

BACKGROUND

Service providers typically offer numerous voice and data services to end users of mobile devices. Some examples of voice services are voice calls, call forwarding, call waiting, etc. Some examples of data services are Internet access, streaming audio, streaming video, online gaming, Internet Protocol television (IP-TV), etc.

The first types of wireless or mobile networks that were introduced by service providers were First Generation (1G) and Second Generation (2G) networks. 1G networks provided voice services via analog signals, and then evolved into 2G networks that provided voice services via digital signals. Mobile communications then evolved into 3G (including 2.5G) networks that provided both voice services and data services. For example, 3G networks are able to provide wireless voice telephony, as well as data services such as Internet access, video calls, mobile TV, etc. Some of the 3G networks implemented by service providers were Universal Mobile Telecommunications System (UMTS) networks, Enhanced Voice Data Optimized (EV-DO) networks, General Packet Radio Service (GPRS) networks, etc. Service providers are now beginning to migrate their networks toward Fourth Generation (4G) technologies over Packet-Switched (PS) networks. 4G networks are essentially enhancements to 3G networks in terms of data speeds. For example, a 3G network can provide data speeds of about 3.5 Mbit/sec. According to the International Telecommunication Union (ITU), a 4G network can provide data speeds of 100 Mbit/sec. One example of a 4G network is a Long Term Evolution (LTE) network.

When a mobile device initiates a session over a PS network (e.g., an IP Connectivity Access Network (IP-CAN) session), the session request from the mobile device includes a description of the requested service (e.g., online gaming, IP-TV, etc). The PS network authenticates the mobile device and determines which services the mobile device is authorized to receive. If the requested service is authorized, then the PS network reserves a bearer path (e.g., an IP-CAN bearer) of a defined capacity, delay, and bit error rate over a selected Packet Data Network (PDN). A flow of packets may then begin for the service, which is referred to as a packet flow, a data flow, or a service data flow (SDF) over the PDN.

The network operators implement Policy and Charging Control (PCC) within their networks to control how services are provided to the end users. Policy control refers to the process of controlling the bearer path for service data flows, such as for bearer establishment, Quality of Service (QoS) control, and gating control (blocking or allowing packets to pass). Charging control refers to the process of associating packets of a service data flow to a charging key or identifier, and applying online charging and/or offline charging as appropriate.

The 3rd Generation Partnership Project (3GPP, 3GPP2) has defined a PCC architecture for PS-core networks. One example of a PCC architecture is described in 3GPP TS 23.203 (Release 9). The PCC architecture suggested by the 3GPP includes a Policy and Charging Rules Function (PCRF), a PDN gateway comprising a Policy and Charging Enforcement Function (PCEF), an application function (AF), a Bearer Binding and Event Reporting Function (BBERF), a Home Subscriber Server (HSS)/Subscription Profile Repository (SPR), an Online Charging System (OCS), and an Offline Charging System (OFCS). As a brief description of some of the elements of the PCC architecture, the PCRF makes policy control decisions to select which PCC rules to implement for a service data flow. The PCEF in the gateway provides service data flow detection, user plane traffic handling, QoS handling, service data flow measurement, and online/offline charging interactions. The HSS/SPR stores subscriber data and subscription-related information for end users, such as in subscriber profiles.

The PCRF in the PCC architecture makes a PCC decision when an end user requests a service. Presently, the PCRF makes the PCC decision based on a predefined set of policy rules and charging rules for the end user that are set out in his/her service plan. This unfortunately does not allow for much flexibility in making a PCC decision when new services are applied to a service data flow.

SUMMARY

Embodiments described herein make improved policy decisions when new services are applied to a service data flow, such as when a new service is added to a service chain. When a new service is added to a service chain that is enabled for a service data flow, a policy control element (e.g., a PCRF) queries an offline charging system for offline charging rules. The policy control element then makes a policy decision for the service data flow based on the offline charging rules and possibly other policy rules applicable to the service data flow. Therefore, the policy decision takes into account the new service that was added to the service chain.

One embodiment comprises a policy control element configured to make policy decisions for a session in a PS-core network. The policy control element includes an interface configured to communicate with an offline charging system. The policy control element further includes a controller configured to detect a new service added to a service chain implemented for a service data flow established during the session, and to transmit a charging rules request to the offline charging system through the interface responsive to detecting the new service being added to the service chain. The controller is configured to receive a response from the offline charging system through the interface that includes offline charging rules that are mapped to the new service of the service chain, to make a policy decision for the service data flow based on the offline charging rules, and to transmit the policy decision to a policy enforcement element.

In another embodiment, the policy control element comprises a Policy and Charging Rules Function (PCRF), and the policy enforcement element comprises a Policy and Charging Enforcement Function (PCEF).

In another embodiment, the PCRF connects with the offline charging system over an Sz reference point. One or more new Attribute Value Pairs (AVPs) is defined for the offline charging rules.

In another embodiment, the PCRF is configured to receive a policy request from the PCEF responsive to the PCEF detecting the new service in the service chain, where the policy request comprises a Diameter Credit Control Request (CCR). The PCRF is configured to transmit a Diameter Credit Control Answer (CCA) to the PCEF that includes the policy decision.

In another embodiment, the PCRF is configured to push the policy decision to the PCEF using a Diameter Re-Authorization Request (RAR).

In another embodiment, the offline charging rules include a rule for a spending limit applicable to the new service of the service chain.

In another embodiment, the controller is configured to notify an end user of the spending limit.

In another embodiment, the controller is configured to insert a service identifier (ID) in the charging rules request sent to the offline charging system, and to receive the offline charging rules from the offline charging system applicable to the service ID.

Another embodiment comprises a method for making a policy decision for a session in a PS-core network. The method includes detecting (in a policy control element) a new service added to a service chain implemented for a service data flow established during the session, and transmitting a charging rules request from the policy control element to an offline charging system responsive to detecting the new service being added to the service chain. The method further includes receiving a response in the policy control element from the offline charging system that includes offline charging rules that are mapped to the new service of the service chain, making the policy decision for the service data flow based on the offline charging rules, and transmitting the policy decision from the policy control element to a policy enforcement element.

Another embodiment comprises a Policy and Charging Control (PCC) architecture in a PS-core network. The PCC architecture includes a Policy and Charging Rules Function (PCRF) configured to communicate with an offline charging system over an Sz reference point. The PCRF is configured to detect a new service added to a service chain implemented for a service data flow established during a session, and to transmit a charging rules request to the offline charging system responsive to detecting the new service being added to the service chain. The PCRF is configured to receive a response from the offline charging system that includes offline charging rules that are mapped to the new service of the service chain, to make a PCC decision for the service data flow based on the offline charging rules, and to transmit the PCC decision to a Policy and Charging Enforcement Function (PCEF).

In another embodiment, the PCRF is configured to receive a policy request from the PCEF responsive to the PCEF detecting the new service in the service chain, where the policy request comprises a Diameter Credit Control Request (CCR). The PCRF is configured to transmit the PCC decision to the PCEF in a Diameter Credit Control Answer (CCA).

In another embodiment, the PCRF is configured to push the PCC decision to the PCEF using a Diameter Re-Authorization Request (RAR).

In another embodiment, the offline charging rules include a rule for a spending limit applicable to the new service of the service chain.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
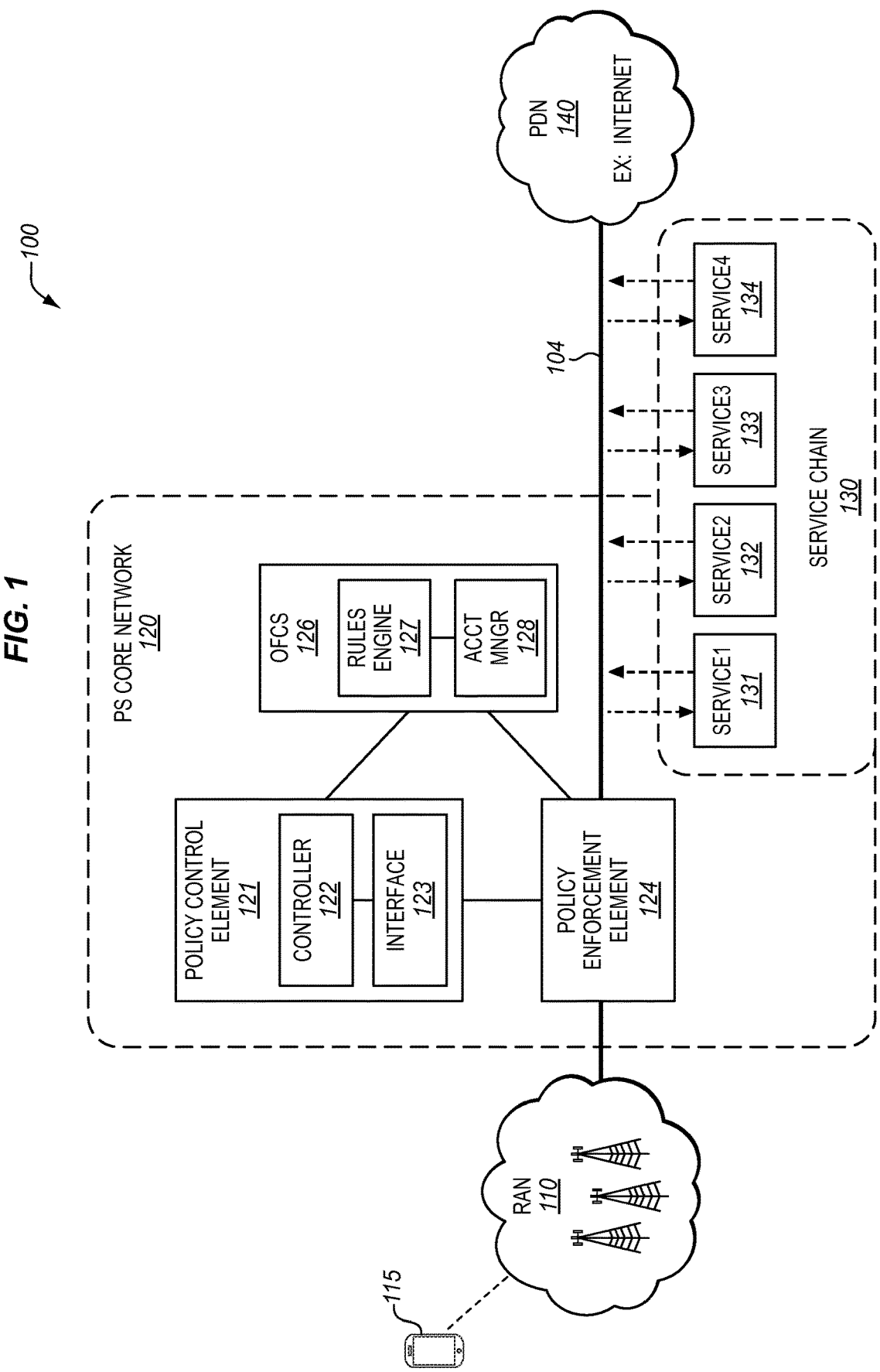
FIG. 1 illustrates a mobile network in an exemplary embodiment.

FIG. 1 illustrates a mobile network 100 in an exemplary embodiment. Mobile network 100 may represent a Long Term Evolution (LTE) network or another type of Third Generation (3G), Fourth Generation (4G), or later generation network. Mobile network 100 includes a Radio Access Network (RAN) 110 and a Packet-Switched (PS) core network 120. RAN 110 and PS-core network 120 provide mobile communication service to end user devices, such as User Equipment (UE) 115. PS-core network 120 is able to access a Packet Data Network (PDN) 140 to provide data services to UE 115, such as web browsing, online gaming, streaming video, streaming audio, etc. One example of PDN 140 is the Internet.

PS-core network 120 includes a policy control element 121 and a policy enforcement element 124. Policy control element 121 comprises any device, component, or module (including hardware) that handles policy decisions for data sessions established over PS-core network 120, which may also be referred to as making a Policy and Charging Control (PCC) decision. One example of policy control element 121 is a Policy and Charging Rules Function (PCRF). Policy control element 121 includes a controller 122 (including a processor) that makes policy decisions for a session having one or more service data flows. Policy control element 121 also includes an interface 123 configured to communicate with an offline charging system, and to communicate with other types of network elements, such as a PCEF. Policy control element 121 may include other modules or functions that are not shown in FIG. 1 to serve a session.

Policy enforcement element 124 comprises any device, component, or module (including hardware) that enforces policy decisions for data sessions. One example of policy enforcement element 124 is a Policy and Charging Enforcement Function (PCEF). Although not shown in FIG. 1, policy enforcement element 124 may have a similar configuration as policy control element 121 with a controller and an interface.

PS-core network 120 further includes an Offline Charging System (OFCS) 126. OFCS 126 comprises any system, server, or function (including hardware) operable to provide offline charging for services/sessions accessed by end users, such as the end user of UE 115. Offline charging is a process where charging information for network resource usage is collected concurrently with resource usage. The charging information is then passed through logical charging functions so that Charging Data Records (CDR) may be generated. The CDRs are transferred to the network operator's billing domain for subscriber billing and/or inter-operator accounting. OFCS 126 stores charging policies for the end users, and is able to generate offline charging rules for individual service data flows based on the charging policies. Charging policies are predefined for each end user and include rules that govern the type of charging applied to a service. For example, a charging policy may define that an end user is a postpaid subscriber, may define tariffs for different services requested by the end user, may define spending limits provisioned for the end user, etc. In this embodiment, OFCS 126 includes a rules engine 127 and an account manager 128. Rules engine 127 is configured to generate offline charging rules based on a number of factors. Account manager 128 is configured to maintain one or more counters for an end user to monitor usage of the end user during a billing period.

PS-core network 120 establishes and maintains sessions for UE 115 of an end user (and other UEs not shown) to allow UE 115 to access data services. UE 115 is a mobile terminal, such as a mobile phone, a computer, a tablet, etc. UE 115 is able to access PS-core network 120 through RAN 110, which comprises any type of network that interfaces UEs with PS-core network 120. Some examples of RAN 110 are a UMTS Terrestrial Radio Access Network (UTRAN), an enhanced UTRAN (E-UTRAN), an Interworking-Wireless Local Area Network (I-WLAN), etc. A session over PS-core network 120 as described herein may be referred to as an IP Connectivity Access Network (IP-CAN) session. An IP-CAN session is an association between UE 115 (represented by an IPv4 address and/or an IPv6 prefix) and PDN 140. An IP-CAN session may incorporate one or more IP-CAN bearers. An IP-CAN bearer is an IP transmission path of a defined capacity, delay and bit error rate, etc. Each IP-CAN bearer may be made up of one or more service data flows, which is a flow of packets.

Mobile network 100 implements service chaining on service data flows that are established during a session. A service chain 130 is an ordered set of services or applications that operate or execute on a service data flow. The services implemented in any particular service chain may vary depending on many factors, such as media type (e.g., email, gaming, streaming video, etc.), location of the end user, time of day, etc. For example, a video service chain may include a traffic compression service, a video optimization service, a web caching service, an HTTP header enrichment service, a firewall service, etc. An email service chain may include a spam detection service, a virus detection service, a phishing service, etc. A service data flow, such as flow 104, may be routed to the different services of service chain 130. The dotted arrows in FIG. 1 illustrate that service data flow 104 may be routed to any of the services in service chain 130. The individual services 131-134 on service chain 130 may be provided by service enablers or service nodes. The service enablers may be part of PS-core network 120 (e.g., part of an application server or application function), or may be implemented by independent or third party providers.

The services in service chain 130 may be updated or changed dynamically while a service data flow is established. For example, a new service (Service5) may be added to service chain 130. When this occurs, a policy decision for service data flow 104 may change due to the added service. In the embodiments described herein, policy control element 121 consults with OFCS 126 before making a new policy decision for the service data flow.

Assume for the following embodiment that a session (e.g., IP-CAN session) is established over PS-core network 120, and that a bearer path (e.g., IP-CAN bearer) is set up for the session. With the bearer path established, service data flow 104 is established and the routing path of service data flow is through service chain 130. Initially, service chain 130 only includes services 131-133. But while the service data flow 104 is established, a new service 134 (Service4) is added to service chain 130. The following illustrates how policy decisions are made in response to the change to service chain 130.

Figure 2:
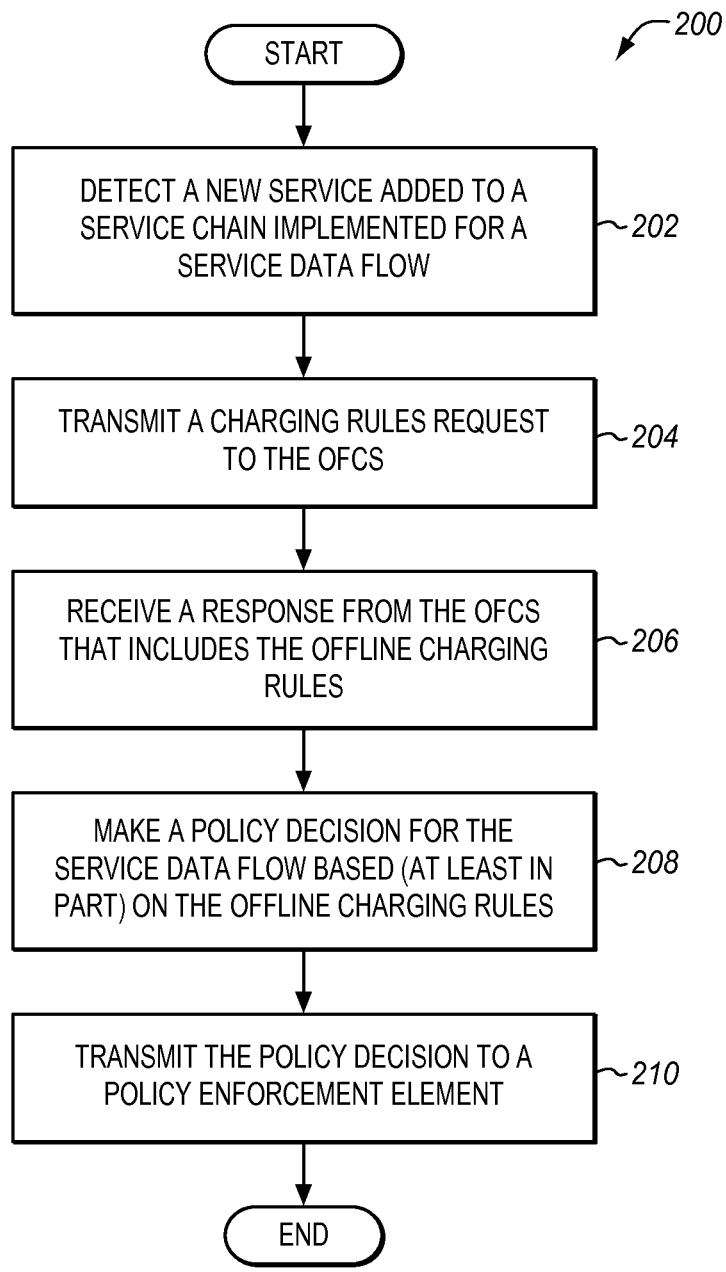
FIG. 2 is a flow chart illustrating a method for making a policy decision in an exemplary embodiment.

FIG. 2 is a flow chart illustrating a method 200 for making a policy decision in an exemplary embodiment. The steps of method 200 will be described with reference to mobile network 100 in FIG. 1, but those skilled in the art will appreciate that method 200 may be performed in other systems. Also, the steps of the flow charts described herein are not all inclusive and may include other steps not shown, and the steps may be performed in an alternative order.

In step 202, controller 122 of policy control element 121 detects a new service added to service chain 130 for service data flow 104. In detecting a new service in the service chain 130, controller 122 may receive a policy request from policy enforcement element 124, where the policy request indicates one or more services added to service chain 130. The new service(s) may be indicated by a service ID inserted in the policy request.

In response to detecting the new service being added to service chain 130, controller 122 transmits a charging rules request to OFCS 126 (step 204) through interface 123. The charging rules request asks OFCS 126 for offline charging rules that are applicable to service data flow 104 now that the new service has been added to the service chain 130 being implemented on service data flow 104. The charging rules request may include an indication (e.g., service ID) for the new service being added to the service chain 130, and may also include an indication for each service of the service chain 130.

Figure 3:
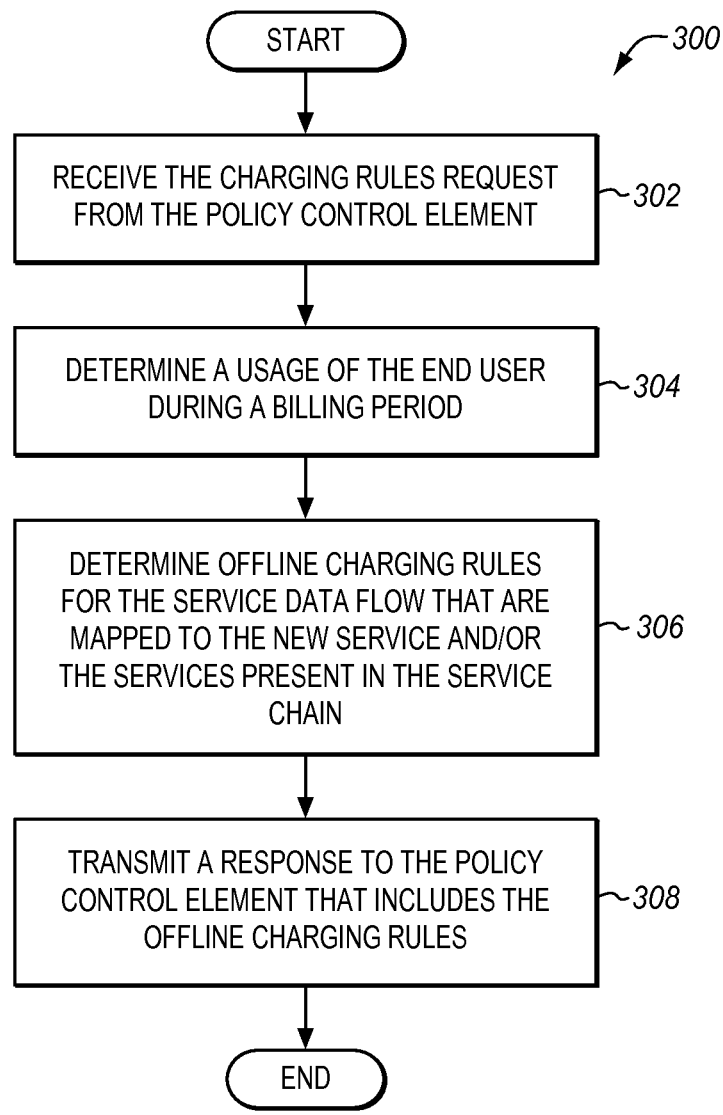
FIG. 3 is a flow chart illustrating a method for determining offline charging rules in an exemplary embodiment.

FIG. 3 is a flow chart illustrating a method 300 for determining offline charging rules in an exemplary embodiment. The steps of method 300 will be described with reference to OFCS 126 in FIG. 1, but those skilled in the art will appreciate that method 300 may be performed in other systems.

OFCS 126 receives the charging rules request from policy control element 121 (step 302) for service data flow 104. Account manager 128 in OFCS 126 determines a usage of the end user during a billing period (step 304). The usage may be monetary ($10 for a month), bandwidth (50 GB for a month), etc., consumed during the billing period. Rules engine 127 then determines offline charging rules for the service data flow 104 that are mapped to the new service and/or the services present in the service chain 130 (step 306). For example, when a new service is added to service chain 130 as described above, rules engine 127 may determine or generate offline charging rules that are applicable to the new service, or to the service chain 130 that includes the new service. The offline charging rules may be applicable to one or more service IDs included in the request from policy control element 121. OFCS 126 then transmits a response to policy control element 121 that includes the offline charging rules (step 308).

One particular offline charging rule may include a spending limit for the service data flow. An end user may define multiple spending limits for different categories of services. If a service is for email, for example, then one spending limit may be defined. If a service is for streaming video, then another spending limit may be defined. The offline charging rules generated by rules engine 127 may therefore indicate one or more spending limits that are applicable to this service data flow 104.

Referring back to FIG. 2, controller 122 receives the response from OFCS 126 that includes the offline charging rules (step 206) through interface 123. Controller 122 may also identify other policy rules for the session in general or for service data flow 104. Controller 122 then makes a policy (e.g., PCC) decision for service data flow 104 based, at least in part, on the offline charging rules (step 208). After making the policy decision, controller 122 transmits the policy decision to policy enforcement element 124 (step 210) for enforcement of the policy decision on service data flow 104.

While enforcing the policy decision in FIG. 1, policy enforcement element 124 may trigger an accounting request for the service data flow 104, such as a Diameter Accounting Request (ACR). Policy enforcement element 124 may insert identifiers for the services in the service chain 130 into the accounting request, and send the accounting request to OFCS 126. This allows OFCS 126 to perform offline charging for service data flow 104.

By having policy control element 121 query OFCS 126 when a new service is added to service chain 130, policy control element 121 can retrieve offline charging rules that are mapped to the new service as well as the other services in service chain 130. Therefore, policy control element 121 can alter the policy decision to account for the change in the service chain 130.

Example

Figure 4:
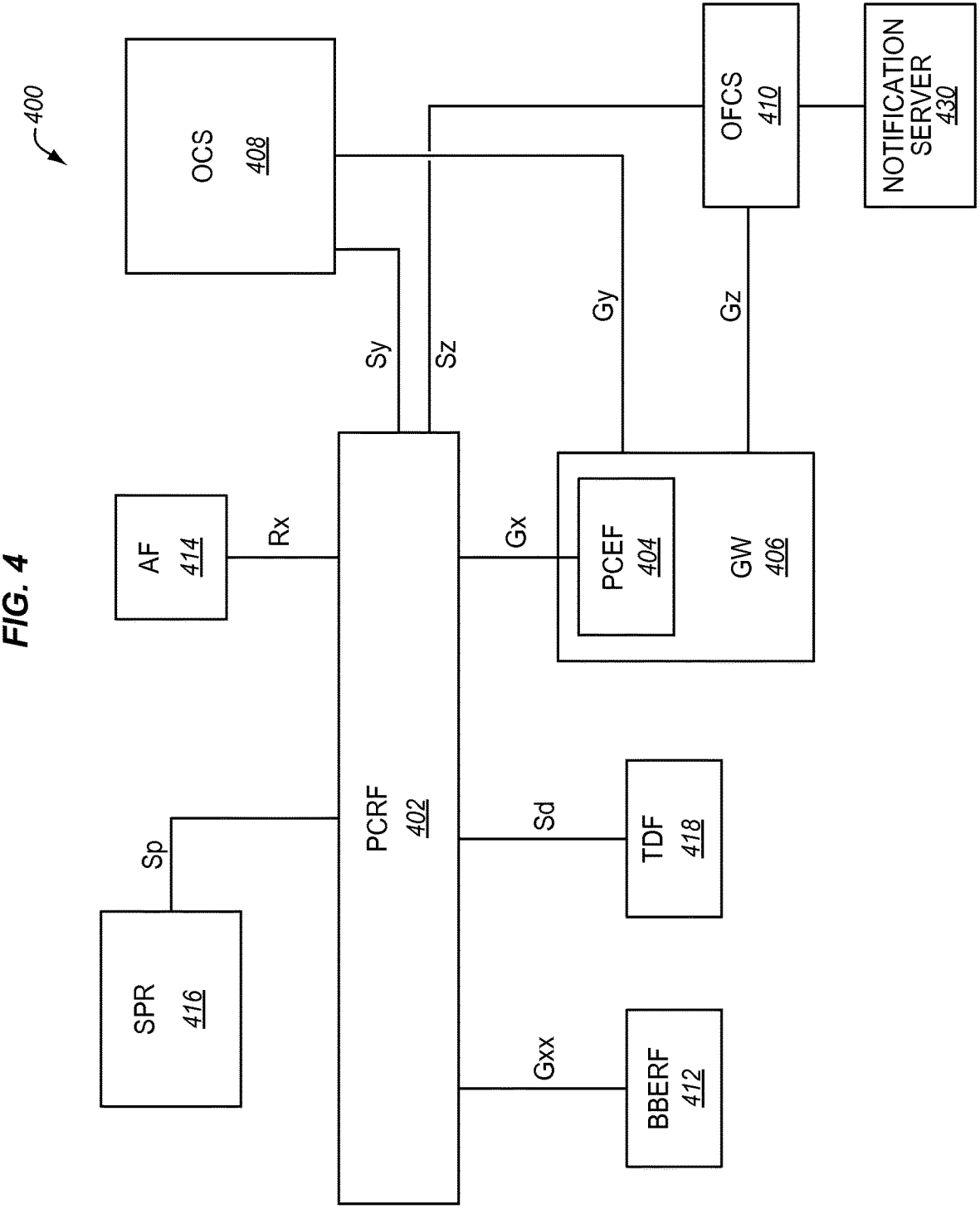
FIG. 4 illustrates a Policy and Charging Control (PCC) architecture for a PS-core network in an exemplary embodiment.

FIG. 4 illustrates a Policy and Charging Control (PCC) architecture 400 for a PS-core network in an exemplary embodiment. The PCC architecture 400 may be used in a Long Term Evolution/Evolved Packet Core (LTE/EPC) network or another type of 3G, 4G, or later generation network. PCC architecture 400 includes a Policy and Charging Rules Function (PCRF) 402 and a Policy and Charging Enforcement Function (PCEF) 404 that together provide a Policy and Charging Control (PCC) solution for a PS-core network.

PCRF 402 encompasses policy control decision and flow-based charging control functionalities. Therefore, PCRF 402 is a node of the PS-core network that generates PCC rules for a requested service, which is referred to as a PCC decision. PCRF 402 may include a policy engine (not shown) that makes the PCC decision. Although the term "PCRF" is used in this description, the functionality of PCRF 402 is applicable to any network node that makes policy decisions in a PS-core network.

PCEF 404 encompasses service data flow detection, policy enforcement, and flow-based charging functionalities. Therefore, PCEF 404 is a node of the PS-core network that enforces the PCC rules. For example, PCEF 404 may set up bearer connections for a session, modify existing bearer connections, ensure that only authorized service data flows are established, ensure that QoS limits are not exceeded, etc. PCEF 404 is typically implemented in a gateway (GW) 406, such as a packet data gateway (P-GW) in an EPC network.

PCC architecture 400 further includes an Online Charging System (OCS) 408, an Offline Charging System (OFCS) 410, a Bearer Binding and Event Reporting Function (BBERF) 412, an application function (AF) 414, a Subscriber Profile Repository (SPR) 416, and a Traffic Detection Function (TDF) 418. OCS 408 provides online charging for services/sessions accessed by end users. In addition, OCS 408 stores online charging rules/plans for the end users which PCRF 402 may use when making a PCC decision. For example, online charging rules may define that an end user is a prepaid subscriber, and may define tariffs for different services requested by the end user. PCRF 402 interfaces with OCS 408 via an Sy reference point or another suitable reference point to exchange charging rules/plans with OCS 408.

AF 414 is an element offering applications that require dynamic policy and/or charging control. AF 414 communicates with PCRF 402 to transfer dynamic session information used for PCC decisions, and to receive session-specific information and notifications about bearer level events. For example, AF 414 may provide IP-addresses, port numbers, bit rates, delay sensitivity, etc., for requested services to PCRF 402. PCRF 402 may then use this information when making the PCC decision. AF 414 communicates with PCRF 402 via an Rx reference point or other suitable protocol interface. One example of AF 414 is a Proxy-Call Session Control Function (P-CSCF) of the IP Multimedia Subsystem (IMS).

SPR 416 is a logical entity that stores subscriber/subscription related information (i.e., subscriber profiles) used for subscription-based policies, and stores PCC rules generated by PCRF 402. SPR 416 interfaces with PCRF 402 via an Sp reference point or another suitable reference point used to exchange policy rules with PCRF 402.

TDF 418 is a functional entity that performs application detection, and reports detected applications and their service data flow descriptions to PCRF 402. TDF 418 may also perform gating, redirection, and bandwidth limitation if a service data flow description cannot be provided to PCRF 402.

OFCS 410 provides offline charging for services/sessions accessed by end users. OFCS 410 is enhanced in this embodiment by having a communication link with PCRF 402. The 3GPP defined a communication link between OCS 408 and PCRF 402, but did not define a communication link between OFCS 410 and PCRF 402. The communication link between OFCS 410 and PCRF 402 may be over an Sz reference point or another suitable reference point.

OFCS 410 is also enhanced to provide spending limit control over sessions that are billed using offline charging. OFCS 410 stores and maintains information related to spending limits, and the Sz reference point enables transfer of the information to PCRF 402.

PCC architecture 400 may further include notification server 430 that is configured to send notifications to end users. For example, notification server 430 may be configured to send a text message (e.g., Short Messaging Service (SMS) or Multimedia Messaging (MMS)) to a UE of an end user, send a real-time message to the UE of the end user, etc.

Figure 5:
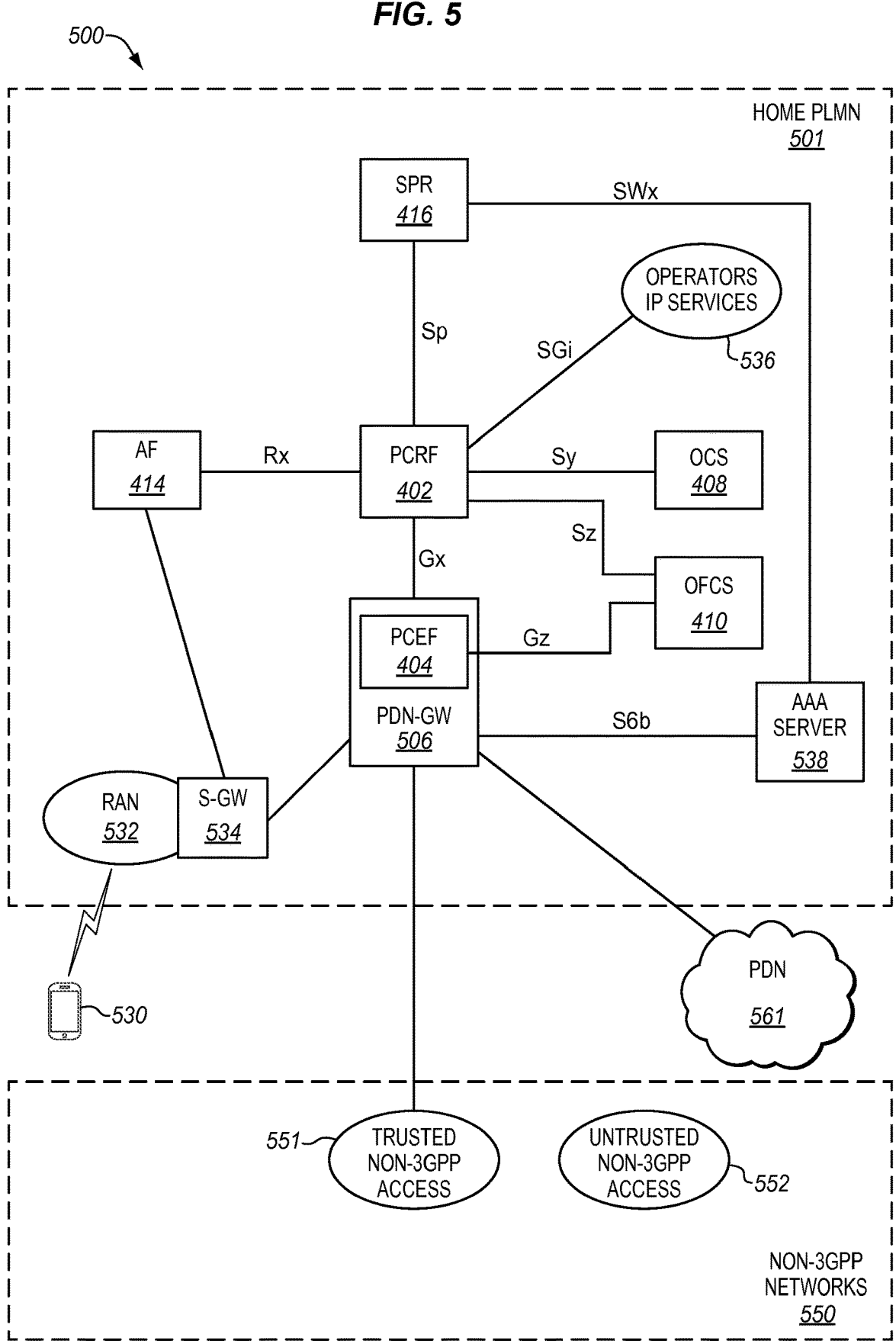
FIG. 5 illustrates a mobile network using the PCC architecture of FIG. 4 in an exemplary embodiment.

The PCC architecture 400 of FIG. 4 may be implemented in a mobile network, such as an LTE network or another type of 4G network. FIG. 5 illustrates a mobile network 500 using the PCC architecture of FIG. 5 in an exemplary embodiment. Mobile network 500 includes a home Public Land Mobile Network (PLMN) 501 and one or more non-3GPP networks 550. Home PLMN 501 represents a PS-core network where an end user of a UE 530 has subscribed to a service plan. Home PLMN 501 includes the following nodes of a PCC architecture: PCRF 402, PCEF 404 implemented in a packet data network gateway (PDN-GW) 506, OCS 408, OFCS 410, application function (AF) 414, and SPR 416. In addition, home PLMN 501 includes a 3GPP Radio Access Network (RAN) 532, a serving gateway (S-GW) 534, operator's IP services 536 (e.g., IP Multimedia Subsystem (IMS)), and an Authentication, Authorization and Accounting (AAA) server 538. Non-3GPP network 550 includes a trusted non-3GPP access network 551 and an un-trusted non-3GPP access network 552.

PDN-GW 506 is connected to one or more Packet Data Networks (PDN) 561. When a service data flow is established for a data session, the service data flow is established over the PDN 561. One assumption for this embodiment is that the end user of UE 530 has subscribed to a service plan with the operator of network 500 for offline charging. The end user may therefore define one or more spending limits for offline charging, which are referred to as Subscriber Spending Limits (SSL). For example, the end user may define a spending limit of $100 per billing cycle.

Another assumption is that a service data flow established for UE 530 will pass through an ordered set of services referred to as a service chain. For example, if the service data flow is for streaming video, then the service data flow may pass through a video optimizer service (or application), a compression service, a firewall service, etc. Mobile network 500 may use Software Defined Networking (SDN), where the control plane for traffic is separated from the underlying systems that forward the traffic. In the past, building a service chain to support a new application took a great deal of time and effort. It meant acquiring network devices and cabling them together in the required sequence. Each service required a specialized hardware device, and each device had to be individually configured with its own command syntax. SDN moves management functions out of the hardware and places it in controller software that executes in a server. A standardized configuration protocol between the controller and network devices replaces proprietary device configuration languages. As a result, entire service chains can be provisioned and constantly reconfigured from the controller. Thus, new services may be dropped into a service chain that is assembled for a service data flow. For example, a service chain for streaming video may include a video optimizer service, a compression service, and a firewall service. SDN allows a network operator to add a virus detection service, for example, and drop this new service into the service chain for a service data flow. When new services are added to a service chain, the policy decision for the service data flow made by PCRF 402 may also change. In this example, PCRF 402 is able to query OFCS 410 to obtain offline charging rules to make the new PCC decision, which is further illustrated in FIG. 5.

Figure 6:
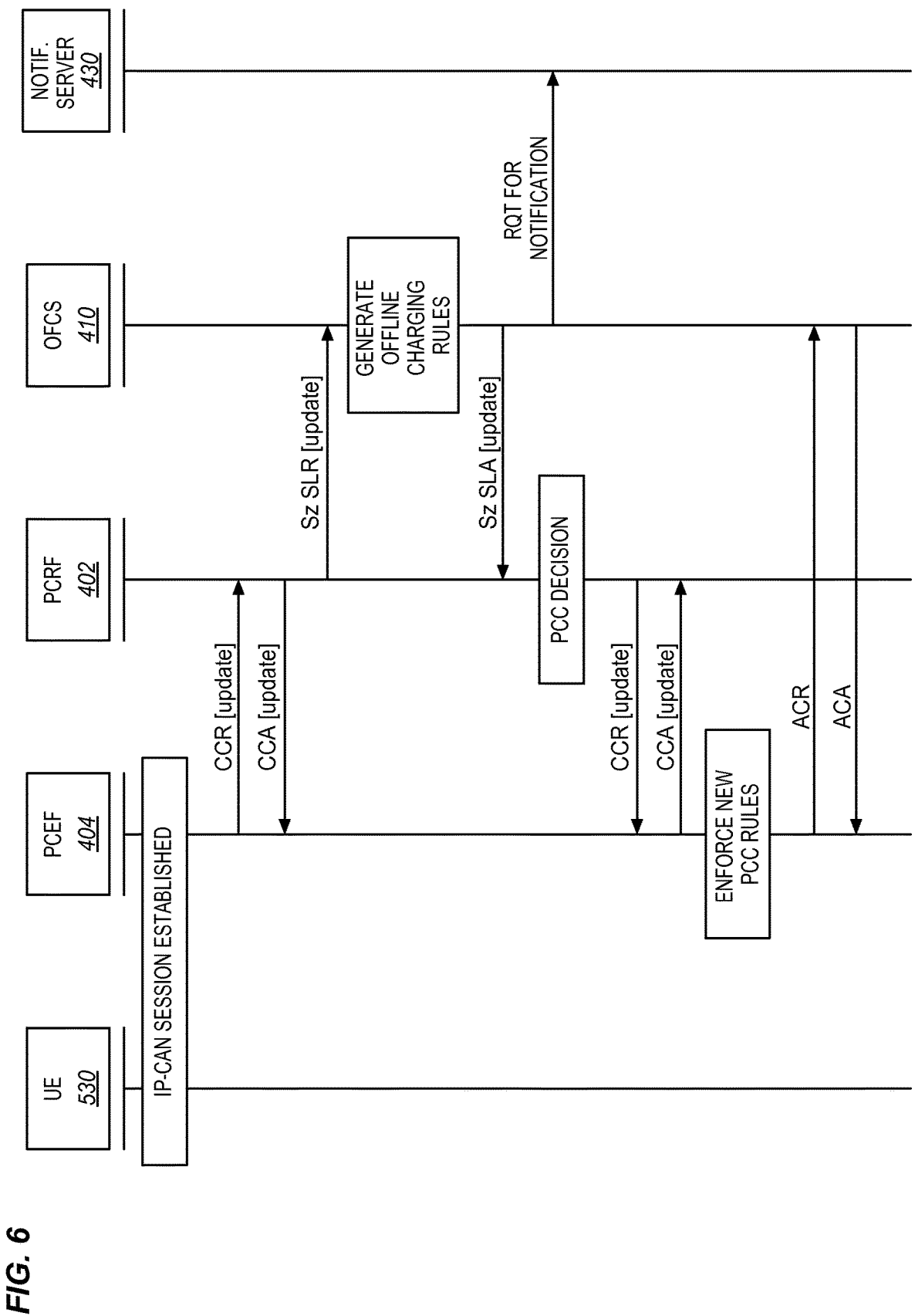
FIG. 6 is a message diagram illustrating PCC for a service data flow in an exemplary embodiment.

FIG. 6 is a message diagram illustrating PCC for a service data flow in an exemplary embodiment. One assumption for this embodiment is that an IP-CAN session is active and a service data flow is initiated for the IP-CAN session. Another assumption is that a service chain has been constructed for this service data flow. When in operation, PCEF 404 (or a Traffic Detection Function (TDF)) performs deep packet inspection on the service data flow and detects that a new service is added to the service chain. For example, the service chain as shown in FIG. 1 may initially include Service1, Service 2, and Service3, and a new Service4 may be added to the service chain. When this occurs, PCEF 404 sends a Gx Credit Control Request (CCR) [update] to PCRF 402 requesting a policy update for the service data flow. The CCR may include a service ID for the new service being added (i.e., Service4) along with service IDs for the other services in the service chain. PCRF 402 responds to the CCR with a Gx Credit Control Answer (CCA) [update].

PCRF 402 is tasked with making a PCC decision for the service data flow. Therefore, PCRF 402 may obtain subscriber data from SPR 416 over the Sp reference point (see FIG. 4). PCRF 402 also queries OFCS 410 to obtain offline charging rules for the service data flow. In this embodiment, PCRF 402 requests a spending limit for the end user by transmitting an Sz Spending-Limit-Request (SLR) [update] to OFCS 410. PCRF 402 may include an identifier (service ID) of the new service in the SLR to indicate the new service being added to the service chain, along with identifiers for the other services in the service chain. The Sz reference point may be enhanced with one or more Attribute Value Pairs (AVP), such as an Offline Charging Rule AVP. The Offline Charging Rule AVP may include sub-AVPs for:

Offline charging spending limit category ID;
Offline charging spending limit volume;
Offline charging spending limit amount;
Offline charging spending limit starting time; and/or
Offline charging spending limit stopping time.

There may be other AVPs in the future to guide service chaining policy.

In response to the SLR, OFCS 410 checks the usage of the end user. OFCS 410 maintains one or more counters for the end user, and tracks the usage of the end user over a time period through one or more service data flows. For example, a counter may be cleared at the beginning of a billing cycle. As the end user places voice calls, surfs the internet, plays an online game, etc., the counter increments based on the usage of the end user during the billing cycle. OFCS 410 also runs a rules engine to determine or generate offline charging rules applicable to the service data flow based on a service plan of the end user, the present usage of the end user, the new service added to the service chain, etc. One particular offline charging rules generated by OFCS 410 may be a spending limit applicable to the service data flow.

OFCS 410 then transmits an Sz Spending-Limit-Answer (SLA) [update] to PCRF 402 that includes the offline charging rules. More particularly, the SLA includes the spending limit for the service data flow. PCRF 402 then makes a PCC decision for the service data flow based in part on the offline charging rules. PCRF 402 then transmits a Gx CCR [update] to PCEF 404 with the PCC decision. PCEF 404 answers back to PCRF 402 with a Gx CCA [update]. Although a CCR/CCA transaction may be used between PCEF 404 and PCRF 402 to provide the PCC decision, PCRF 402 may push the PCC decision to PCEF 404. For instance, PCRF 402 may insert the PCC decision in a Diameter Re-Authorization Request (RAR), and transmit the RAR to PCEF 404.

OFCS 410 may also notify the end user when the offline charging rules have changed (e.g., the spending limit has changed). To do so, OFCS 410 may send a request to notification server 430 requesting that a notification be sent to the end user, such as through UE 530. The notification may include a total usage (e.g., monetary, volume, duration) for the present billing cycle, a present rate for the service data flow, a future rate for the service data flow, a spending limit for the service data flow, etc.

PCEF 404 then enforces the PCC decision for the service data flow. As part of enforcing the PCC decision, PCEF 404 may remove one or more services from the service chain based on the PCC decision. For example, if a spending limit indicated in the PCC decision does not allow for one or more services in the service chain, then PCEF 404 may remove the service(s) from the service chain.

PCEF 404 may also assist in routing the service data flow along a routing path through a service chain. The routing path may be inserted in the headers of the packets in the service data flow. For instance, the routing path may be indicated by a stack of MPLS labels inserted in packet headers. The labels indicate the various services and order of the services. The first label causes the network to route the packet to the first service in the service chain. The first service pops its label from the stack, and forwards the packet to the next service indicated by the next label in the stack. This process continues as each packet progresses through the service chain.

PCEF 404 may also generate offline charging requests for the service data flow. For example, PCEF 404 may trigger a Diameter Accounting Request (ACR) for the service data flow, and insert the service IDs for the services in the service chain. PCEF 404 then transmits the ACR to OFCS 410.

The architecture described above allows for more effective PCC for service data flows. Because services may be dropped into a service chain of an established service data flow, PCRF 402 is enhanced as described above to query OFCS 410 for offline charging rules that take the newly added service into consideration. The PCRF 402 then makes a PCC decision based (in part) on the offline charging rules so that the correct policies are being implemented for the new service chain. This architecture will be able to handle PCC when SDN is implemented in current and future networks.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
a policy control element configured to make policy decisions for a session in a Packet-Switched (PS) core network, wherein a service data flow for the session is routed through a service chain which is an ordered set of services that operate on the service data flow, the policy control element comprising:
an interface configured to communicate with an offline charging system; and
a controller configured to detect a new service added to the service chain that operates on the service data flow, and to transmit a charging rules request to the offline charging system through the interface responsive to detecting the new service being added to the service chain;
the controller is configured to receive a response from the offline charging system through the interface that includes offline charging rules that are mapped to the new service of the service chain, to make a policy decision for the service data flow based on the offline charging rules, and to transmit the policy decision to a policy enforcement element.

2. The apparatus of claim 1 wherein:
the policy control element comprises a Policy and Charging Rules Function (PCRF); and
the policy enforcement element comprises a Policy and Charging Enforcement Function (PCEF).

3. The apparatus of claim 2 wherein:
the PCRF connects with the offline charging system over an Sz reference point; and
at least one new Attribute Value Pair (AVP) is defined for the offline charging rules.

4. The apparatus of claim 3 wherein:
the PCRF is configured to receive a policy request from the PCEF responsive to the PCEF detecting the new service in the service chain, wherein the policy request comprises a Diameter Credit Control Request (CCR); and
the PCRF is configured to transmit a Diameter Credit Control Answer (CCA) to the PCEF that includes the policy decision.

5. The apparatus of claim 3 wherein:
the PCRF is configured to push the policy decision to the PCEF using a Diameter Re-Authorization Request (RAR).

6. The apparatus of claim 1 wherein:
the offline charging rules include a rule for a spending limit applicable to the new service of the service chain.

7. The apparatus of claim 6 wherein:
the controller is configured to notify an end user of the spending limit.

8. The apparatus of claim 1 wherein:
the controller is configured to insert a service identifier (ID) in the charging rules request sent to the offline charging system, and to receive the offline charging rules from the offline charging system applicable to the service ID.

9. A method for making a policy decision for a session in a Packet-Switched (PS) core network, the method comprising:
- establishing a service data flow for the session, and routing the service data flow through a service chain which is an ordered set of services that operate on the service data flow;
- detecting, in a policy control element, a new service added to the service chain that operates on the service data flow;
- transmitting a charging rules request from the policy control element to an offline charging system responsive to detecting the new service being added to the service chain;
- receiving a response in the policy control element from the offline charging system that includes offline charging rules that are mapped to the new service of the service chain;
- making the policy decision for the service data flow based on the offline charging rules; and
- transmitting the policy decision from the policy control element to a policy enforcement element.

10. The method of claim 9 wherein:
- the policy control element comprises a Policy and Charging Rules Function (PCRF); and
- the policy enforcement element comprises a Policy and Charging Enforcement Function (PCEF).

11. The method of claim 10 wherein:
- the PCRF connects with the offline charging system over an Sz reference point; and
- at least one new Attribute Value Pair (AVP) is defined for the offline charging rules.

12. The method of claim 11 further comprising:
- receiving a policy request in the PCRF from the PCEF responsive to the PCEF detecting the new service in the service chain, wherein the policy request comprises a Diameter Credit Control Request (CCR); and
- transmitting a Diameter Credit Control Answer (CCA) from the PCRF to the PCEF that includes the policy decision.

13. The method of claim 11 further comprising:
- pushing the policy decision from the PCRF to the PCEF using a Diameter Re-Authorization Request (RAR).

14. The method of claim 9 wherein:
- the offline charging rules include a rule for a spending limit applicable to the new service of the service chain.

15. The method of claim 14 further comprising:
- notifying an end user of the spending limit.

16. The method of claim 9 further comprising:
- inserting a service identifier (ID) in the charging rules request sent to the offline charging system, wherein the offline charging rules received from the offline charging system are applicable to the service ID.

17. A Policy and Charging Control (PCC) architecture comprising:
- a Policy and Charging Rules Function (PCRF) of a Packet-Switched (PS) core network that establishes a session for User Equipment (UE), wherein a service data flow for the session is routed through a service chain which is an ordered set of services that operate on the service data flow;
- the PCRF is configured to communicate with an offline charging system over an Sz reference point;
- the PCRF is configured to detect a new service added to the service chain that operates on the service data flow, to transmit a charging rules request to the offline charging system responsive to detecting the new service being added to the service chain, to receive a response from the offline charging system that includes offline charging rules that are mapped to the new service of the service chain, to make a PCC decision for the service data flow based on the offline charging rules, and to transmit the PCC decision to a Policy and Charging Enforcement Function (PCEF).

18. The PCC architecture of claim 17 wherein:
- the PCRF is configured to receive a policy request from the PCEF responsive to the PCEF detecting the new service in the service chain, wherein the policy request comprises a Diameter Credit Control Request (CCR); and
- the PCRF is configured to transmit the PCC decision to the PCEF in a Diameter Credit Control Answer (CCA).

19. The PCC architecture of claim 17 wherein:
- the PCRF is configured to push the PCC decision to the PCEF using a Diameter Re-Authorization Request (RAR).

20. The PCC architecture of claim 17 wherein:
- the offline charging rules include a rule for a spending limit applicable to the new service of the service chain.

* * * * *